United States Patent [19]

Casey

[11] Patent Number: 4,865,160
[45] Date of Patent: Sep. 12, 1989

[54] DUAL DISK BRAKE

[75] Inventor: Gary L. Casey, Troy, Mich.

[73] Assignee: Allied-Signal Inc., Morris Township, Morris County, N.J.

[21] Appl. No.: 318,387

[22] Filed: Mar. 2, 1989

Related U.S. Application Data

[62] Division of Ser. No. 134,639, Dec. 18, 1987, Pat. No. 4,844,206.

[51] Int. Cl.$^4$ .............................. B60T 1/06
[52] U.S. Cl. .................... 188/18 A; 188/71.5; 188/73.38; 188/218 XL; 188/73.45
[58] Field of Search .............. 188/18 A, 71.5, 72.4, 188/73.1, 73.2, 73.35, 73.37, 73.38, 73.36, 218 XL, 218 R, 218 A, 73.45, 250 E, 250 R; 192/107 R, 70.17, 70.19, 70.2, 70.21, 106.2

[56] References Cited

U.S. PATENT DOCUMENTS

| | | | |
|---|---|---|---|
| 2,985,259 | 5/1961 | Gardner | 188/71.5 |
| 3,630,320 | 12/1971 | Luchmann | 192/70.2 X |
| 3,650,357 | 3/1972 | Nelson et al. | 188/71.5 |
| 3,782,509 | 1/1974 | Cook et al. | 188/73.43 |
| 4,046,232 | 9/1977 | Kellogg | 188/73.1 |
| 4,055,236 | 10/1977 | Dowell | 188/73.2 |
| 4,143,561 | 3/1979 | Melhorn | 192/106.2 X |
| 4,180,148 | 12/1979 | Souma | 188/73.38 |
| 4,181,200 | 1/1980 | Souma | 188/73.38 |
| 4,209,083 | 6/1980 | Gerard | 188/73.32 |
| 4,245,723 | 1/1981 | Moriya | 188/73.38 X |
| 4,249,642 | 2/1981 | Anderson et al. | 188/218 XL X |
| 4,382,493 | 5/1983 | Le Warre, Sr. | 188/73.35 X |
| 4,391,355 | 7/1983 | Evans | 188/73.1 X |
| 4,465,165 | 8/1984 | Bok | 188/218 XL |
| 4,469,204 | 9/1984 | Bok et al. | 188/218 XL |
| 4,511,021 | 4/1985 | Grider | 188/218 XL |
| 4,529,067 | 7/1985 | Scott | 188/73.45 X |
| 4,540,067 | 9/1985 | Meynier | 188/71.8 X |
| 4,576,255 | 3/1986 | Mery et al. | 188/71.5 |
| 4,585,096 | 4/1986 | Bok | 188/71.5 X |
| 4,598,799 | 7/1986 | Thioux | 188/71.5 |
| 4,605,103 | 8/1986 | Carre et al. | 188/71.5 |
| 4,618,034 | 10/1986 | Weber et al. | 188/73.39 X |
| 4,784,246 | 11/1988 | Edmisten | 188/218 XL |

FOREIGN PATENT DOCUMENTS 0133389 2/1985 European Pat. Off. .......... 188/71.5

Primary Examiner—Douglas C. Butler
Attorney, Agent, or Firm—Markell Seitzman

[57] ABSTRACT

A disk brake comprising of a disk hub adapted to be mounted to a wheel; a plurality of annularly shaped rotors or disks; a device for mounting the rotors to the disk hub such that the rotors rotate with disk hub and are free to slide in a first direction substantially perpendicular to the direction of rotation; a pair of opposing situated brake pads, one associated with each rotor, and a device for urging the brake pads into frictional engagement with the rotors. Specially shaped liners interposed grooves of the hub and teeth of the rotors. A second set of liners is fitted between a brake caliper and the brake pads.

5 Claims, 3 Drawing Sheets

DUAL DISK BRAKE

This Application is a division of application Ser. No. 134,639, filed 12/18/87, now U.S. Pat. No. 4,844,206.

BACKGROUND AND SUMMARY OF THE INVENTION

The present invention relates generally to disk brakes and more particularly to disk brakes which employ a plurality of rotors or disks slidably mounted relative to a fixed caliper.

One of the inherent problems associated with conventional disk brakes is that the required clamping loads are quite high for a given torque. To generate such clamping loads requires massive calipers. The size of these calipers necessitates the use of disks or rotors of reduced diameter. The high clamping loads similarly dictate the use of large diameter cylinders within the calipers and coupled with the deflection of the caliper create a brake having a "spongy" feel. In addition, the high clamping loads generate increased heat; conventional disk brakes use a large amounts of metal to dissipate the heat and are therefore heavier than a drum brake equilivent.

The principal advantage of the dual disk brakes is lower clamping loads. The effect of the lower clamping loads permits a reduction in the weight and perhaps the cost of the dual disk brake. A pronounced problem of the prior dual disk brakes is that they have tended to bind or brinnel on their hub and are prone to rattle.

In the preferred embodiment of the invention, a plurality of annular shaped rotors are splined to a disk hub. The plurality of rotors present increased surface areas which distributes heat quickly, thus proportionately reducing lining temperature and providing for faster fade recovery. more specifically, the splined design of one enbodiment of the present invention includes a plurality of grooves formed in a disk hub and a like plurality of teeth formed in each of two rotors. In another embodiment of the invention the teeth are formed on the disk hub and the grooves are formed in the rotors. A hardened stainless steel liner is placed in a groove and receives a corresponding tooth in a manner to distribute the load from the tooth throughout the relatively soft disk hub. This liner is arcuately shaped and includes a deformable wall to absorb torque and to cushion the rotor. At very high torque levels this deformable wall bottoms out, which enhances the distribution of forces onto the disk hub. In one embodiment these liners have a loaded flat side and a curved side which loads the disk in a direction to reduce the amount of "squirming" during breaking. Another embodiment uses rotor teeth with parallel sides. In this way the rotor is located only by the sides of the teeth as they are biased into the disk hub and not by the bottom of the groove, thereby allowing for greater thermal expansion without loss of guidance. By utilizing the sliding dual rotor configuration of the present invention, several options are available regarding the construction of the caliper housing. One of these options is to use a stamped steel caliper bridge. This is possible because the clamping loads generated between the caliper and each rotor are reduced by a factor of two (2). Further, it first should be noted that the in the present invention the caliper can be fixedly mounted to the steering knuckle as opposed to prior designs that require the caliper to absorb torque while being slideable attached to the steering knuckle.

One important characteristic of a brake is fluid stiffness, that is, the volume of fluid that has to be added (or deleted) to change applied torque by a given amount. This fluid stiffness is affected by the rigidity or structural stiffness of the caliper, this is as the caliper deflects more or less fluid, as the case may be, is needed to change the applied torque. In the present invention the piston area can be half that of a single disk design so the bridge of the caliper could be made half as stiff in order for the overall stiffness of the system to be the same. In actual practice, the twin disk design is generally 30 per cent to 50 per cent stiffer than conventional brakes. A counter factor presented by dual disk brakes is that the total pad compression may be increased since four (4) pads are used in series instead of two (2). In actual practice, however, since the total pad area is greater, the thickness can be reduced, offsetting this effect.

In addition, generally the total friction material required in a brake is determined by wear characteristics and the desired life. In the present twin disk brake, since brake effort is divided between four (4) pads, each pad will exhibit one-half the wear per pad (when compared to two pad brakes). Consequently, operating temperatures are lowered and wear is reduced. Therefore, it is reasonable that the lining material used in the present invention could be one-half the thickness of a conventional brake.

Accordingly, the preferred embodiment of the invention comprises: a disk brake including a disk hub adapted to be mounted to a wheel, a plurality of annular rotors or disks, means for mounting the rotors to the disk hub such that the rotors rotate with disk hub and are free to slide in a first direction substantially perpendicular to the direction of rotation, a plurality of opposing situated brake pads, one associated with each rotor and means for urging the brake pads into sequential frictional engagement with the rotors. Specially shaped liners interpose grooves in the disk hub and teeth on each rotor. A second set of liners is fitted between a caliper bridge and the plurality of brake pads to enhance sliding and reduce friction.

Many other objects and purposes of the invention will be clear from the following detailed description of the drawings.

DETAILED DESCRIPTION OF THE DRAWINGS

Figure 1:
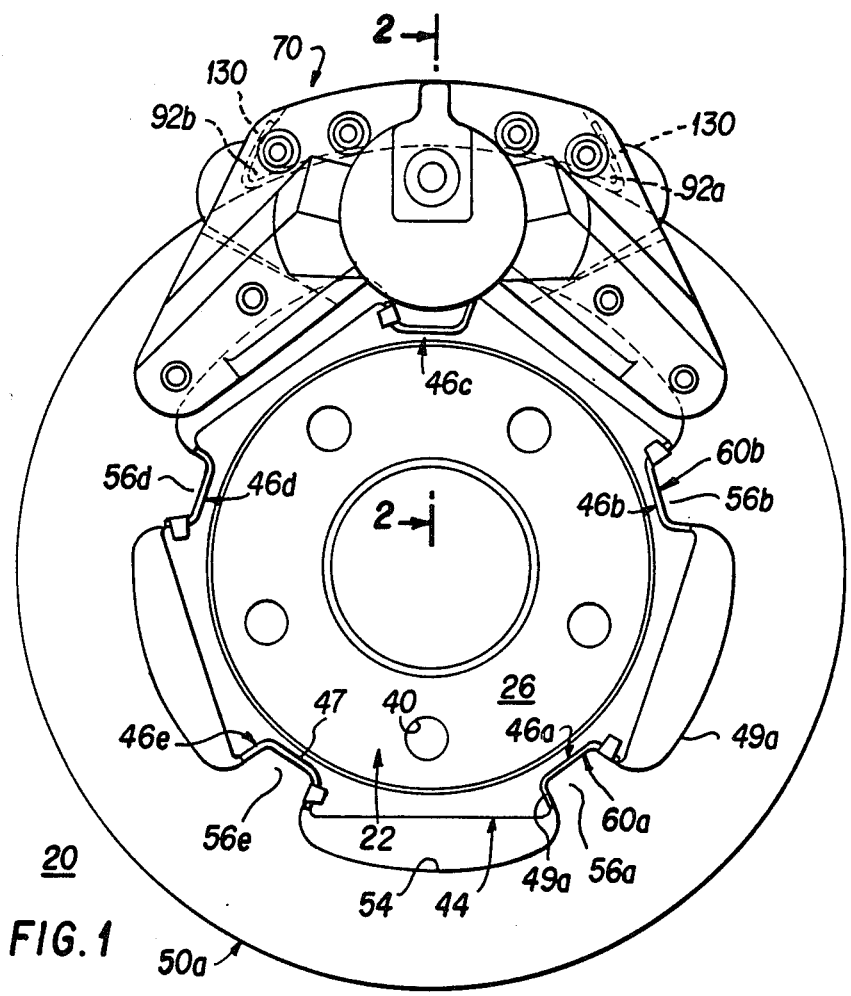
FIG. 1 illustrates a cross-sectional top view of a disk brake constructed in accordance with the present invention.
Figure 2:
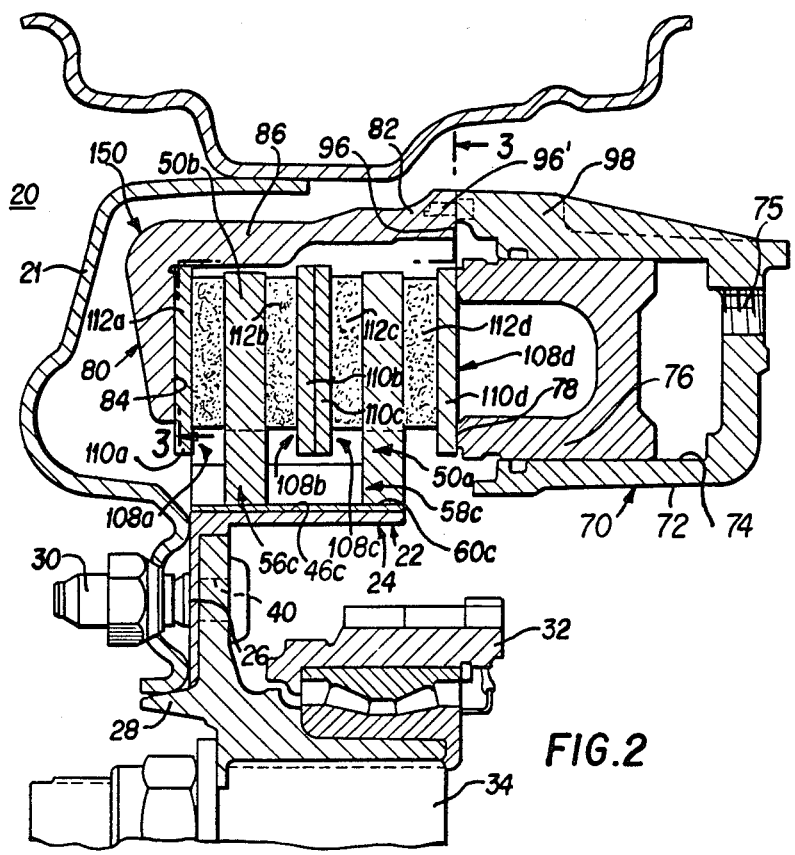
FIG. 2 illustrates a front plane view of various components illustrated in FIG. 1.

FIGS. 1 and 2 illustrate a dual disk brake 20 mounted within a conventional vehicle wheel 21. The disk brake 20 includes a cylindrical disk hub 22. The disk hub includes an axially extending cylindrical wall 24 and a radially extending, substantially flat wall 26. The configuration illustrated in FIG. 1 is typical of that used in front wheel drive vehicles. The wheel 21 is mounted to a wheel hub 28 and secured thereto by a plurality of lugs 30. The wheel hub is supported by a steering knuckle 32 of known variety. The wheel hub is drivingly connected to a drive shaft 34. It should be appreciated that while the invention is illustrated in the context of the front wheel drive vehicle, the invention is not so limited and may be employed on any of the wheels of the vehicle.

The wheel 21, wheel hub 28, drive shaft 34, and lugs 30 have not been shown in FIG. 1 to avoid undue cluttering of this FIGURE. The disk hub 22 is adapted to be mounted to the wheel hub 28 and to the wheel 21. Such mounting means may include a plurality of openings 40 through which are received the various lugs 30. The exterior of the wall 24 is formed as a polygon-type structure. More specifically, as illustrated in FIGURE 2, this structure is of the form of a pentagon having five sides 44 extending perpendicular to the radial wall 26. Formed at the intersection of each of these sides 44 are axially extending grooves or slots 46a–e. Each groove 46 includes a bottom 47 and walls 49 extending outwardly therefrom. Slidably received within the grooves or slots 46 are first and second rotors or disks 50a and 50b. The words rotors and disks are used interchangably herein. The rotors are preferrably fabricated of cast iron but may be made of other materials are are of substantially annular, ring-like construction. Extending inwardly from the inner edge 54 of each rotor 50a and b are a plurality of teeth 56a–e and 58a–e. FIG. 2 shows a plan view of the rotor 50a illustrating the placement of its teeth 56. The same number of teeth (58a–e) are similarly fabricated on rotor 50b (only tooth 58c is shown in FIG. 2). As noted above, the preferred embodiment of the invention utilizes five grooves 46 and five conformally shaped teeth 56 or 58. It has been found that it is preferrable to utilize an odd number of grooves and teeth so as to minimize the vibration of the rotors 50a and b during brake application. While the number of grooves and teeth illustrated in FIG. 2 is equal to five, it should be appreciated that more or less, or even or odd numbers of grooves and teeth are contemplated within the scope of the present invention.

In order to reduce the cost and weight of a disk brake manufactured in accordance with the present invention, the disk hub 22 need not be fabricated of a material having the durability of the material used for the rotor. Further, in order to enhance the ability of the rotors to slide in the grooves 46, to distribute the compressive loading of the rotors over a greater area of the disk hub, to reduce contact stress and corrosion, and to reduce the vibration and rattle of the rotors relative to the disk hub, a plurality of spring inserts 60a–e are fitted to the disk hub and positioned between the various slots 46 and the teeth 56, 58 of the rotors 50. It should be appreciated that the thickness of these various inserts 60 has been increased to clearly show them in the FIGURES.

Figure 8:
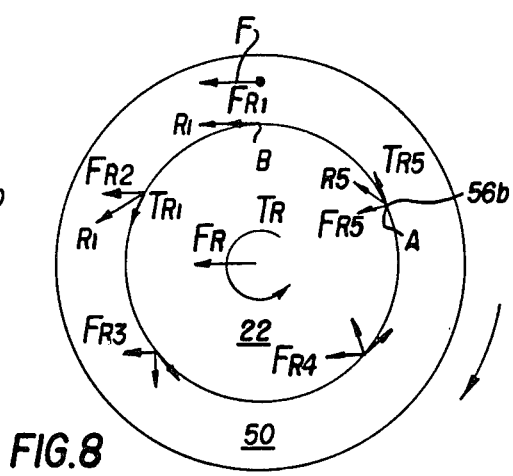
FIG. 8 illustrates a schematic free body force diagram.
Figure 3:
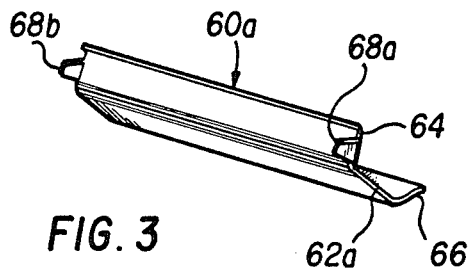
FIG. 3 illustrates a projected view of an insert.

A typical insert such as insert 60 is illustrated in FIG. 3. The profile of each insert is substantially U-shaped having a bottom 62 and extending resilient walls 64 and 66. As can be seen in FIGS. 2 3 and 8, at least one wall, such as wall 66, is arcuately shaped to effectively spring load the rotors against the disk hub 22. During assembly, the inserts 60 are fitted to the respective grooves 46 and secured to the disk hub 22 by a plurality of extending tabs 68a and b. When the brakes are applied, the rotors will be loaded against the disk hub 22 compressing the arcuate wall 66 thereby distributing compressive loads along the length of the groove 46.

It is illustrative, at this point, to compare the construction of the present invention with that of conventional disk brakes. As described above, the rotors 50 of the present invention are designed to slide relative to the disk hub 26. In addition, the total inner surface 54 of each rotor is not in contact with the brake hub. In contrast, conventional rotors are not movable in a lateral direction (it is the caliper which slides). Further, these prior rotors cannot expand inwardly since they are in total contact with other vehicle or wheel components. Consequently, as these prior rotors expand they also distort, such distortion causing the frequently sensed vibration under heavy braking. In contrast, as can be seen from FIG. 2, a significant portion of the inner side of the annularly shaped rotors 50, with the exception of the extending teeth, are spaced from the sides 44 of the disk hub 22, as such the rotors of the present invention are free to expand and distortion is reduced or totally eliminated. Further, conventional disc brakes often generate an audible squeal which occurs during heavy braking which is due in part to the distortion of the rotors. The rotors of the present invention exhibit less distortion and are significantly quieter. During braking a large amount of heat is generated. This heat must be dissipated through the rotor to avoid causing heat distortion, as such prior rotors are often ventilated to assist heat distribution, thus increasing the weight of the rotor. The rotors of the present invention must also dissipate heat. Dissipation is enhanced by the increased surface area of the two rotors without sacrificing weight.

Figure 7:
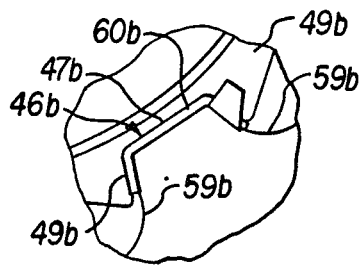
FIG. 7 is an enlargement of a portion of FIG. 1.

FIG. 7 is an enlargement of one of the grooves 46b showing its bottom 47b and extending walls 49b and b'. Fitted to the groove 46b is tooth 56b having a bottom 57b and sides 59b and b'. Positioned between the tooth 56b and the slot 46b is the insert 60b. The angle of the tooth sides 59 and also the angle of the sides 49 of the groove 46b has been chosen to minimize contact pressure and to minimize the tendency for the rotor to "squirm." This effect occurs because the force imported from the rotor to the hub is a combination of a lateral force and a torque (since the friction contact is concentrated at the caliper). Therefore, each tooth sees a combination of forces that have a resultant force vector that changes in magnitude and direction during rotation. In the present invention the angle of the tooth is made perpendicular to the resultant force vector at the point of rotation where the magnitude is greatest, thus eliminating the tendency for the rotor to continuously shift positions during rotation. The methodology of determing the above-mentioned angles is described with reference to FIG. 8 which is a schematic free-body diaphragm of the disk hub 22 and one of the rotors 50. Upon activation of a brake caliber 70 (described below) a reaction force vector F is generated on each rotor 50. This reaction force vector can be translated to the center of the disk hub 22 and is represented by an equivalent friction force and torsional force $F_F$ and $T_R$ respectively. The components of the axial frictional force $F_R$ have been shown by the horizontal force vectors located at the diagramatical positions of each of the teeth 56 shown in FIG. 2. The components of the torsional reaction torque $T_R$ have been shown as radially acting vectors $T_{Ri}$ at the point of location of each of the respective teeth 56. Each of the axial and torsional reaction vector components have been summed using conventional vector notation to generate a resultant reaction force at each tooth location. As can be seen, the various reaction forces $R_1$–$R_5$ applied to each tooth during breaking varies both in magnitude and direction. It has been found that the maximum resultant force during braking will occur somewhere between the points A and B. As such the angle of the side wall 59$b'$ and the angle of the wall 49$b'$ are chosen to be perpendicular to the resultant force vector $R_5$ with the angle of the opposite side walls 59$b$ and 49$b$ equal though opposite thereto. Having determined the above relation, the geometry of the other teeth and grooves is identical.

As mentioned above, an alternate embodiment to the invention shown in FIGS. 1 and 2 can be achieved by fabricating the walls of the teeth and grooves as parallel. It is envisioned that the bottoms 57 of the teeth would be spaced sufficiently from the liners 60 so that the bottoms do not contribute to centering the rotors within the grooves of the disk hub 22. The centering or locating of the rotors relative to the disk hub is accomplished as all of the spring or curved sides of the liners bias the rotor teeth into the opposing wall of the groove. In this manner the rotors may expand freely as their temperature increases.

Figure 9:
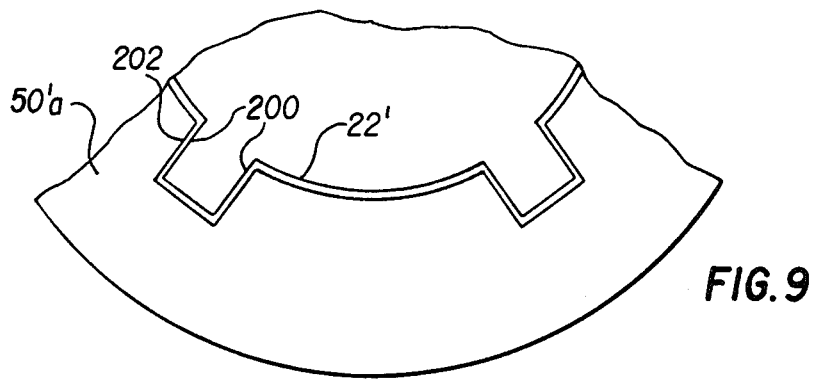
FIG. 9 illustrates an alternate embodiment of the invention.

FIG. 9 illustrates an alternative embodiment of the invention wherein a disk hub 22' comprises a plurality of radially extending teeth 200 and wherein each of the two disks such as 50$a'$ and 50$b'$ include grooves 202 to receive the teeth 200. FIG. 9 illustrates only disk 50$a'$.

Figure 4:
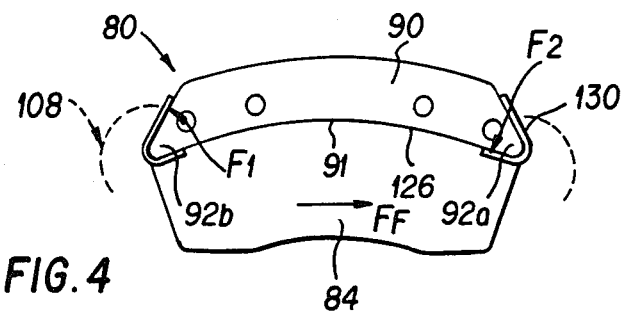
FIG. 4 illustrates an isolated plan view of a caliper bridge illustrated in FIGS. 1 and 2.
Figure 5:
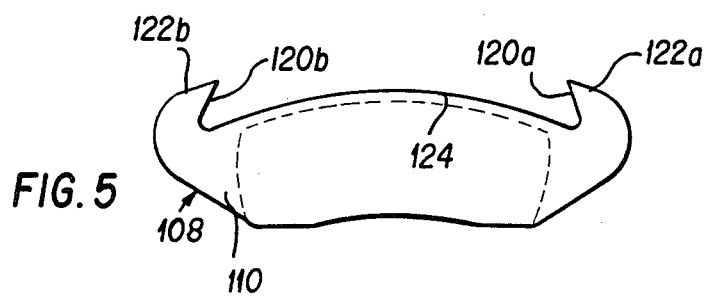
FIG. 5 is a plan view of one of the four brake pads shown in FIG. 1.

Reference is again made to FIGS. 1 and 2. To slow the motion of the wheels 21, the present invention utilizes a brake caliper assembly generally shown as 70. The caliper assembly comprises a housing 72 which defines a cylinder 74 into which is received brake fluid through an inlet port 75. Reciprocatively positioned within the cylinder is a piston 76. Appropriate sealing is used between the housing 72 and the piston 76 to present brake fluid from leaking therefrom. The extending face 78 of the piston defines a first engagement surface. Extending from the housing 72 is a caliper bridge 80. The caliper bridge 80 includes a bridge or axially extending portion 86 and an end face 84. The end face 84 may be integrally formed as part of the bridge portion or separate therefrom. The end face also defines a second engagement surface 84. The bridge portion 86 is generally arcuately shaped and may be fastened to the housing 72 by bolts 82 or the like. The bridge portion 86 is shown in partial isolation in FIG. 4. The bridge portion 86 comprises curved upper and lower surfaces 90 and 91. The surfaces 90 and 91 are tapered at ends 92$a$ and 92$b$. As can be seen from FIG. 2, the end 96 of the bridge portion 86 engages a mating surface 96' of the top segment 98 of the housing.

The tapered sides 92$a$ and b of the caliper bridge 80 support a plurality of brake pads 108a-d. Each brake pad 108a-d comprises a backing plate 110e and a pad of friction material 112. As can be seen from FIG. 2, the first rotor 59$a$ is fitted between the brake pads 108a and b while the second rotor 50$a$ is fitted between the brake pads 108c and d.

Figure 6:
FIG. 6 is a projected view of another insert which is also shown in FIG. 2.

As mentioned above, the bridge portion 86 of the caliper bridge 80 includes the tapered sides 92$a$ and 92$b$. Each of the backing plates 110$a$–$d$ which are preferably fabricated of steel, includes inwardly projecting taps 122$a$ and $b$ and an arcuately shaped middle surface 124 which is conformal to the arcuately shaped lower surface 91 of the caliper bridge 80. The tabs 122 and middle surface 124 cooperate to define grooves 120$a$ and $b$ having the same shape as the sides 92a,b. The various backing plates 110$a$–$d$ are slid onto the caliper bridge 80 prior to attachment to the housing 72. The securement of the various backing plates 110 in tangential and radial directions is achieved by the cooperation of the tapered ends 92 with the grooves 120. An insert or liner, such as, insert 130 (see FIGS. 2,4,6) is positioned between each tapered side 92$a$ and 92$b$ and the grooves of the backing plates. Upon assembly the inserts 130 lightly bias the various backing plates away from the caliper bridge in order to prevent rattling. In addition, it is contemplated that such inserts 130 are fabricated of hardened stainless steel and distribute the compressive loading of the various backing plates along the length of the tapered sides 92$a$ and 92$b$, and provide a smooth surface upon which the backing plates may slide, reducing wear of the caliper bridge and brake pads and preventing corrosion.

As mentioned above, the grooves 120$a,b$ are received upon the tapered sides 92$a,b$ respectively. The angle of the surfaces of the sides 92$a,b$ and hence the angle of grooves 120 are set such that the reaction to the friction force $F_F$ (see FIG. 4) on each pad 108 (i.e. tabs 122 of the backing plates 108) is normal to the respective upper and lower surface of the grooves. This relationship can be seen from FIG. 4 which illustrates the reaction to the friction force FF on a typical brake pad 108 which has been resolved in two forces $F_1$ and $F_2$ acting normal to the surfaces of the sides 92$a,b$.

In operation, prior to the activation of the piston 76, the wheel 21, disk hub 22, and various other components are freely rotating. In addition, the rotors 50$a$ and b which are attached to the disk hub 26 are rotating relative to the various pairs of brake pads 108. Upon application of the brake pedal, the piston 76 is moved outwardly from the housing 72 thereby causing the various brake pads to engage the rotors in a sequential manner. As an example, the friction material pad 112$d$ is urged by the piston 76 onto the rotor 50$a$. This action moves the rotor into contact with the opposingly positioned friction material pad 112$c$. Thereafter, and in a similar manner, the backing plate 110$c$ urges the friction material pad 112$b$ into contact with rotor 50$b$ which in turn urges the rotor 50$b$ against the friction material pad 112$d$. The above motion produces a frictional engagement between the various friction pads and their corresponding rotors thereby decelerating the motion of the wheel. Upon release of the brake pedal, the pressure within the cylinder 74 will decrease and the above-described frictional engagement between the various friction pads and the rotors is terminated. Thereafter the various friction pads will remain a closely positioned relative to the rotors.

From the above it can be seen that the present invention utilizes four friction surfaces which are engaged in a serial manner to reduce the rotational speed of the various rotors. By using the two pairs of brake pads, the present invention generates twice the amount of braking force as compared with conventional disk brakes which utilize a single rotor and a single pair of opposingly positioned friction pads. As such, to achieve the same braking force as that required in a conventional caliper/disc brake system, it is only necessary to exert one-half of the force previously used. This reduction in the force required to actuate the brake may be sufficient to eliminate the need for power brake boosters. Further, since the braking forces are now distributed across the caliper bridge by four backing plates, the lighter thereby improving overall vehicle weight efficiency.

The basic advantage of this brake is that the braking effort is distributed among four friction surfaces instead of two. This characteristic can be taken advantage of in several ways. First, the clamping loads are halved, allowing the use of a caliper that is half the strength while maintaining the same effective stiffness as defined by the volume of fluid required to affect a given change in brake torque. The increased surface area of the rotors increases heat transfer to the air. In addition, the inner diameter of the rotor can be increased, reducing the overhang 150 of the bridge structure, further allowing a thinner bridge. As an example, by increasing the inner diameter of the rotor compressive forces acting across the brake pads will be moved closer to the caliper bridge, reducing the tortional force that the caliper bridge must withstand. The thinner bridge allows the use of an even larger diameter rotor, further reducing the clamping force requirement and increasing the surface area of the rotors. The larger inner diameter of the rotor also allows use of a larger diameter splined tooth section, reducing the load on each tooth. The reduced temperature produced by superior cooling improves the durability of the lining material, allowing the use of thinner friction material pads. Also, since wear is distributed over four friction material pads, pad thickness can be reduced further. Reduced heat input per friction surface means that each rotor can have half the mass of a conventional rotor, eliminating the need for ventilated rotors. Further, the rotors are simple in shape alternate materials such as stamped steel, copper, or aluminum are practical.

Many changes and modifications in the above described embodiment of the invention can, of course, be carried out without departing from the scope thereof. Accordingly, that scope is intended to be limited only by the scope of the appended claims.

In the claims:

1. A disk brake comprising:
    a disk hub adapted to be mounted to a wheel;
    a plurality of flat, annularly shaped rotors or disks;
    means, formed by the disk hub and rotors for attaching the rotors to the disk hub such that the rotors rotate with disk hub and are free to slide in a first direction substantially perpendicular to the direction of wheel rotation;
    a plurality of pairs of opposing situated brake pads, one pair associated with each rotor and means for urging the brake pads into frictional engagement with their respective rotors,
    wherein the attaching means includes a plurality of grooves, extending in the first direction and a like plurality of mating teeth slidably received within corresponding grooves, and
    wherein each groove comprises a flat bottom and walls outwardly extending from the bottom, and
    wherein the attaching means further includes an insert or liner between each groove and corresponding tooth, and
    wherein the insert comprises a thin walled structure including a bottom adapted to seat upon the bottom of the groove and walls extending outwardly therefrom, and
    wherein one of the walls of the insert is arcuately shaped to bias corresponding teeth towards an opposite wall of its corresponding groove.

2. The brake as defined in claim 1 wherein the arcuately shaped insert wall nominally urges the rotors in a direction opposite to the direction of rotation.

3. The brake as defined in claim 1 wherein the insert includes means for securing same to the brake hub, and wherein the securing means includes a plurality of tabs extending from one wall of the insert adapted to fit to an end wall of a respective disk hub.

4. The brake as defined in claim 1 wherein the plurality of grooves are formed in the disk hub and extend in the first direction, and wherein each rotor includes a plurality of mating teeth extending from an inner edge thereof.

5. The brake as defined in claim 1 wherein the angle of one of the walls is chosen to be perpendicular to a maximum resultant friction reaction force and wherein the angle of the other wall is equal and opposite in direction.

* * * * *